United States Patent [19]

Deussner

[11] 4,289,483
[45] Sep. 15, 1981

[54] APPARATUS FOR THE MUTLI-STEP CALCINATION OF CEMENT-CLINKER

[75] Inventor: Herbert Deussner, Bergisch Gladbach, Fed. Rep. of Germany

[73] Assignee: Klöckner-Humboldt-Deutz AG, Fed. Rep. of Germany

[21] Appl. No.: 72,095

[22] Filed: Sep. 4, 1979

Related U.S. Application Data

[62] Division of Ser. No. 888,696, Mar. 21, 1978, Pat. No. 4,183,762.

[30] Foreign Application Priority Data

Mar. 21, 1977 [DE] Fed. Rep. of Germany ....... 2712238

[51] Int. Cl.³ ............................ F27B 7/02; F27B 3/04
[52] U.S. Cl. .................................. 432/106; 432/163
[58] Field of Search ......................... 432/14, 106, 163

[56] References Cited

U.S. PATENT DOCUMENTS

| 3,938,949 | 2/1976 | Christiansen | 432/106 |
| 4,094,626 | 6/1978 | Boyhont et al. | 432/106 |
| 4,108,593 | 8/1978 | Christiansen | 432/106 |
| 4,130,390 | 12/1978 | Kobayashi et al. | 432/14 |

Primary Examiner—John J. Camby
Attorney, Agent, or Firm—Hill, Van Santen, Steadman, Chiara & Simpson

[57] ABSTRACT

Apparatus for the production of cement from raw material to the clinker stage is disclosed. The raw material is first heated in a heat exchanger with the heat energy being supplied by the waste heat from subsequent stages of this process. The heated raw material is then passed into a heat exchanger to be partially calcined. Calcination is completed in another heat exchanger, with the waste heat used in the final calcination being supplemented with combustion of a fuel. The calcined material is then passed to a kiln for conversion to clinker, from which the material is then cooled, the warmed cooling air to be used partially for combustion in the kiln and partially during calcination.

8 Claims, 2 Drawing Figures

APPARATUS FOR THE MUTLI-STEP CALCINATION OF CEMENT-CLINKER

This is a division, of application Ser. No. 888,696, filed Mar. 21, 1978, now issued as U.S. Pat. No. 4,183,762, Jan. 15, 1980.

BACKGROUND OF THE INVENTION

The invention relates to a method and apparatus for the production of cement, and more particularly for the production of raw material to the clinker stage by thermal treatment of the raw material in specific steps including a preheating step, a calcination step which is divided into two stages for a precalcination and after-calcination stage, a sintering step and a cooling step and wherein heat is supplied by combustible fuel in the sintering step and the after-calcination step with the material, air, and gases being uniquely handled for improved process steps and improved resultant material.

Various methods and apparatus for the thermal treatment of raw material to be used in the manufacture of cement have been used heretofore using combustibe fuel for supplying heat in a calcination step and in a sintering step to receive the raw material from the calcination step and supply it to the sintering step in series arrangement. Generally in previous arrangements heretofore used, the sintering step receives combustion air directly from the cooling step and certain arrangements have been used for handling the gas and air from the sintering and cooling step to the calcination step.

In one arrangement, the necessary air for the combustion of fuel is supplied separately to the calcination step being received from the cooling step and may flow in excess through the sintering step and enter in mixture with the exhaust gases of the sintering step into the calcination step. The total quantity of oxygen required in the combustion zone of the calcination step will be advanced with the exhaust gases of the rotary kiln. (German Laid Open Specification No. 23 24 565).

It is also known to supply directly the necessary combustion air for the calcination step directly thereto while bypassing the sintering step. In this arrangement, the air is unmixed for the combustion of fuels in the calcination step, and the exhaust gases are then combined with the exhaust gases of the sintering step passed onto the calcination step and supplied to the preheating step (German Laid Open Specification No. 22 48 030).

Furthermore, it has been known in one form to provide the necessary combustion air the calcination step supplied directly to the calcination step while bypassing the sintering step, however, after mixture with the exhaust gases issuing from the sintering step. This mixture of combustion air and exhaust gases of the sintering step serves for the combustion of fuels delivered to the calcination step, after which the exhaust gases of the calcination step are conveyed entirely to the preheating step (German Laid Open Specification No. 23 60 580).

All of the above methods and methods heretofore used have appreciable disadvantages concerning the procedure of calcination with respect to the speed of operation and heat requirement. A number of these disadvantages reside in the mechanism for driving out the $CO_2$ from a particle of limestone.

It is known that the calcination of a particle of limestone is dependent on three parameters:
1. The grain size of the particle.
2. the duration of the particle in the atmosphere of the heating medium, and
3. the calcination temperature.

The grain size and grain distribution of an industrially manufactured comminuted raw material for cement can hardly be influenced, and is not controllable through agglomeration procedures in the heat exchanger. The duration of the particles of limestone or calcite in the calcination step is not more than several seconds, for example, in the case of a suspension heat exchanger.

As an economically feasible measure, attempts are, therefore, undertaken in the alteration of the parameter of "calcination temperature" for the following reasons:

From the heating medium which is usually gaseous, which surrounds the particle of limestone, the necessary deacidification heat must be transferred to the particle. For this, of course, the heating medium must necessarily have a higher temperature than the particle of limestone. As soon as the outer layer of the particle is deacidified, deacidification heat must be transferred through the outer layer to the interior of the particle. Both the heat transfer and heat conduction processes proceed more quickly with higher temperature differences. Heat transfer and heat conduction into the center of the particle on the other hand are hindered by the $CO_2$ being driven out, which flows within the particle opposite the direction of heat transfer, and upon leaving the particle surface, this disturbs the heat transfer from the heating medium to the surface of the particle.

When the heat imparting medium during deacidification is supplied with no further heat, and the heat capacity utilizable for deacidification is determined and limited only through the difference between its temperature at the beginning of the deacidification operation and the deacidification temperature itself, because of the endothermic deacidification operation, the temperature of the heat medium rapidly drops. Therefore, the conditions for the progress of the calcination operation become progressively worse.

If, however, the atmosphere surrounding the particle to be deacidified is constituted as a heat imparting medium so that fuel may be burned, the course of calcination is itself improved because the temperature of the heat imparting medium even upon continuous deacidification of the particle does not drop as long as fuel heat is still supplied. Contrarily, the temperature actually rises theoretically with increasing deacidification and the conduction of heat into the interior of the particle is hindered.

It has been found, however, in practice that this procedure is disturbed when the atmosphere surrounding the particle at the beginning of combustion consists to an appreciable extent of inert gases, even when the gases with higher starting temperatures offer utilizable heat for deacidification. On the other hand, as the specific quantity of gases increase, it leads to the fact that even with the combustion of a predetermined equally large quantity of fuel and pure air, the drop in temperature of the heating medium can attain the lower limit at which no sufficient transfer of heat takes place for deacidification. The supply of further fuel heat for the increase of calcination could indeed theoretically bring about an improvement in the calcination operation. However, this leads to increased losses in exhaust gas at the beginning of the preheating step so that this measure is economically not feasible.

Known methods referred to above incur the disadvantages described, and these occur in one or another manner and lead to an increased use of heat for the calcination of cement clinker. The disadvantages are additionally increased in that the time limit inherent through the use of the available apparatus, for the calcination operation, and because of the non-influenceable grain size and grain distribution, lead to the fact that the heating medium cannot given off the theoretically available quantity of heat.

An object of the present invention is to provide a method and apparatus to overcome the foregoing disadvantages and provide an improved method for the multi-step calcination of cement clinkers to make it possible to carry out an unimpeded and rapid calcination of raw material in the calcination step and at the same time improve the economy of heat utilization in the calcination process.

A feature of the invention is the solution of the problems provided by the prior art, and the attainment of the objectives set forth above by providing the calcination step to be divided into a precalcination stage and an after-calcination stage wherein the raw material to be treated first passes through a precalcination step and subsequently through an after-calcination step. In the precalcination step, the material is heated exclusively by exhaust gases from the sintering kiln and in the after-calcination step the material is heated through the combustion of fuel and by means of air. The division of the calcination of raw material into two stages has the advantage that the calcination procedure is controlled exactly and may be adjusted better to a predetermined degree of calcination. Thus, in the precalcination stage, the heat transfer for high heating of raw material and the beginning of calcination takes place without resistance so that in spite of dropping temperature, the heat imparting medium transfers heat to the materials rapidly. In the after-calcination step, by virtue of the supply of heat from fuel combusted air, it insures that an atmosphere exists advantageous to calcination, and the temperature difference required for a positive heat transfer with continuous calcination can be optimally adjusted. Accordingly, the best possible utilization of fuel is insured with optimum guidance of the calcination process, and the economy of heat of the calcination and combustion process is improved. The arrangement also provides for the utilization of combustion air in the after-calcination step received from exhaust air from the cooling step.

In accordance with the principles of the invention, the exhaust gases of the precalcination and after-calcination stages are used in common for preheating the raw material in the preheating step. In this manner the total quantity of hot exhaust gases from the sintering step and the total quantity of hot combustion gases from the calcination step are utilized for preheating the raw material. In the preheating step, no substantial chemical processes, particularly no release of $CO_2$ from the limestone takes place, and the utilizable heat content of the hot gases for preheating the raw material are utilized.

It is a further feature of the invention that it is provided that a portion of the exhaust gases from the sintering kiln are bled off before the gases flow to the precalcination step. This arrangement provides that with alkali containing raw materials, the volatilized alkalis may be partially removed from the process so that alkali circulations in the combustion process are reduced to an appreciable degree thereby preventing the danger of disturbances of the calcination process.

The invention also relates to an improved apparatus for carrying out the method of the invention. The apparatus includes a device for preheating, calcination, sintering and cooling of raw material. The device is divided into apparatus for steps and stages and provides a precalcination and after-calcination device wherein the raw material is consecutively passed from one to another, and wherein the precalcination device is used in combination with the sintering kiln, and the after-calcination device in combination with mechanism for the supply of combustion air. Apparatus is furnished for the manufacture of cement to the clinker stage were it is possible to the first time to calcine raw materials optimally in two steps separated from one another. In the precalcination step, the raw material is brought into contact exclusively with hot gases of the sintering step so that there is a very rapid heat transfer takes place to the material. Subsequently, the highly heated and precalcinated material is brought into a hot gas atmosphere in which optimum conditions are provided for the further and complete calcination of the material. Therefore, the calcination step permits the limestone particles to be calcined with a maximum or full utilization of combustion heat. The after-calcination device is used in connection with a cooling device so that the exahsut air of the cooling step is used in the after-calcination step.

The apparatus is arranged to provide that the precalcination and after-calcination devices are used in connection with the preheating step. With this arrangement, it is possible to make use of the entire quantity of hot exhaust gases received in both the precalcination and after-calcination steps for the preheating of the raw material.

In accordance with the invention, the preferred arrangement utilizes cyclone heat exchangers for the preheating, precalcination and after-calcination steps. In the apparatus, it is possible for the comminuted raw materials to be used advantageously in the production of cement, and with fine dispersion of comminuted raw materials in a hot gas stream, particularly favorable conditions are insured with respect to the operation in both precalcination and after-calcination steps.

Other objects, advantages and features, as well as equivalent structures and methods which are intended to be covered herein, will become more apparent with the teaching of the preferred embodiment in the specification, claims and drawings, in which:

DRAWINGS

DESCRIPTION

Figure 1:
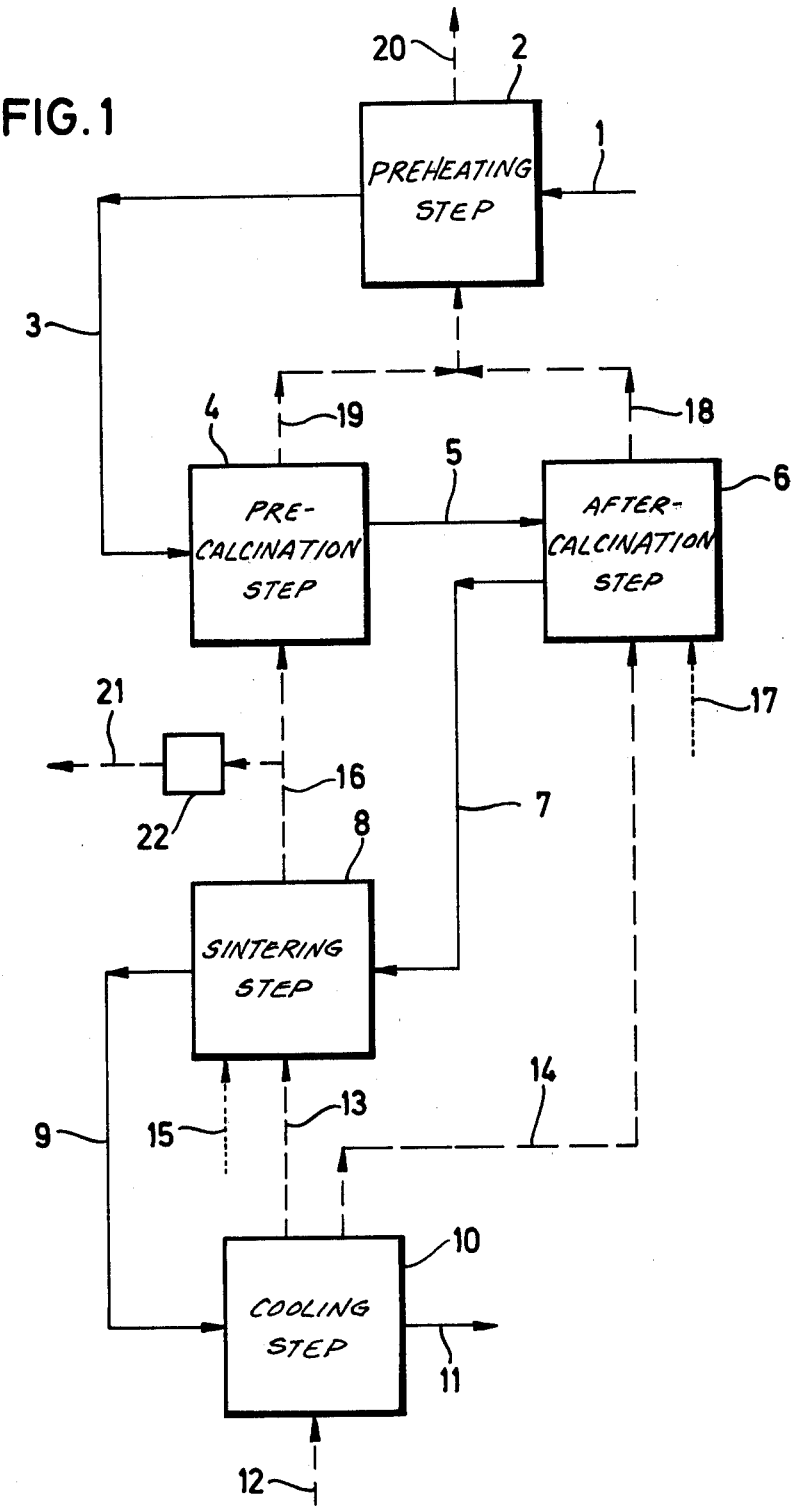
FIG. 1 is a diagrammatic disclosure of the course of the method according to the invention without indication of special forms of embodiment of the individual method steps.

In FIG. 1 is shown diagrammatically the course of the method according to the invention. The cold raw material 1 is delivered to the preheating step 2 and enters from the latter as heated raw material 3 into the precalcination step 4 wherein it is highly heated and precalcined. Subsequently the pre-calcined raw material 5 is introduced into the after-calcination step 6, and leaves the same as deacidified material 7. The latter is delivered to the sintering step 8 and leaves the same as cement clinker 9. The cooling of the clinker takes place hereupon in the cooling step 10. With the exit of the cooled clinker 11 from the cooling step 10, the method is closed to the multi-step calcination of cement clinker.

For the direct and or indirect cooling in the cooling step 10, preferably air 12 is used, which is guided as heated combustion air with a partial stream 13 into the sintering step and with another partial stream 14 into the after-calcination zone 6. In the sintering step 8 takes place the combustion of the fuel 15, whereby the exhaust gases 16 of the sintering step are conveyed to the precalcination step 4. In the after-calcination step 6 the portion of fuel 17 is calcined, whereby the exhaust gases 18 of this step in common with the exhaust gases 19 of the pre-calcination step 4 are used as heating medium in the preheating step 2. From this preheating step issue finally the exhaust gases 20 which if need be may be utilized for the drying of the raw material or respectively, for further method steps connected in series with the calcination method. A partial stream 21 of the exhuast gases 16 may according to the invention be removed through a partial gas withdrawal 22 from the calcination process, in order thus to prevent the occurrence of circulations of harmful material between sintering step and preheating step.

The method according to the invention may preferably in the case of the treatment of raw material be utilized in the form of comminuted raw material, however naturally also then when the raw material for example is to be treated granulated.

The devices for carrying out the individual steps of the method shown diagrammatically in FIG. 1 consist fundamentally of a device for the preheating of the raw material, for its high-heating and its pre- and after-calcination and a device for the sintering of the material to cement clinker, further of a device for the cooling of the separated clinker. These devices should for reasons of an optimal heat economy of a cement-production-installation operate in countercurrent, and the device for the pre- and after-calcination of the raw material for cement should likewise operate in countercurrent. There are, however, for the method steps according to the invention, also devices operating in transverse- or direct-flow and finally combinations of all are of course possible.

Figure 2:
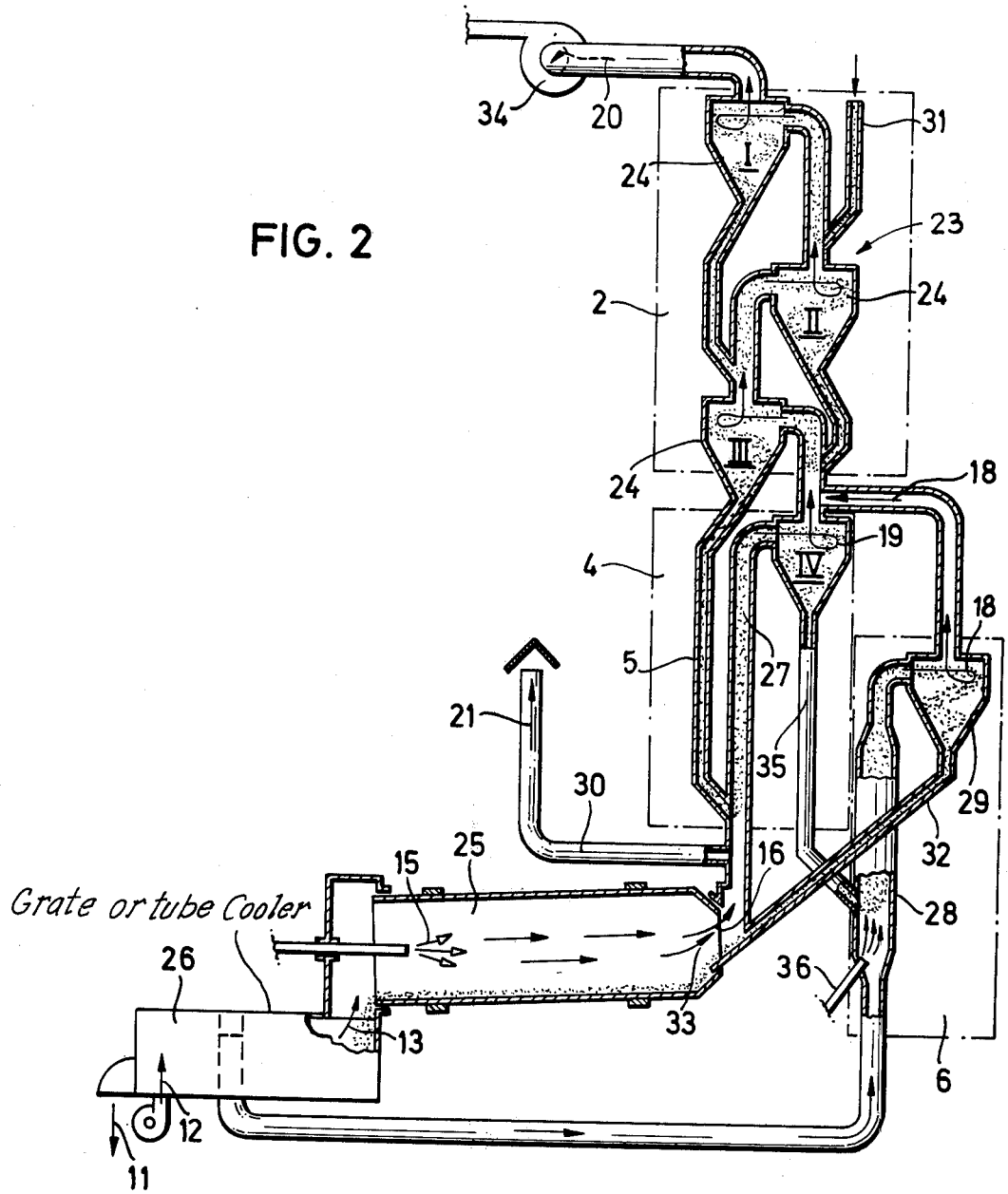
FIG. 2 is a diagrammatic disclosure of a cement-producing installation for carrying out the method according to the invention.

In FIG. 2 is shown a preferred embodiment of a cement installation for carrying out the method according to the invention. This cement installation consists of a suspension-gas-heat-exchanger 23 with four cyclones 24 arranged superimposed which are connected in series with a rotary kiln 25 to which on its part is connected a grate or tube cooler 26. The suspension gas heat exchanger consists of a preheating step 2 having three cyclones, a precalcination step 4 formed by the lowermost cyclone and the furnace-exhaust-gas-conduit 27 and an after-calcination step 6 connected in series on the comminuted raw material side formed of the reaction section 28 and a separator cyclone 29. In the exhaust-gas-conduit 27 leading to the lowermost cyclone is arranged directly at the outlet of the exhaust gases from the rotary kiln, a device 30 for a partial-gas-withdrawal 21. The suspension-gas-heat-exchanger 23 has in the upper area an inlet 31 for cold comminuted raw material and has in the lower area an offtake 32 for the preheated and calcined comminuted material which connects the separator cyclone 29 of the after-calcination step 6 with the furnace-inlet-head 33 of the rotary kiln. The suspension-gas-heat-exchanger 23 is finally on the exhaust-gas side connected in series with a regulable blower 34.

The diagrammatically shown installation according to FIG. 2 has known measuring- and regulating-techniques known from the modern method techniques which serve for the supervision and regulation of the cement-production-process even during the introduction of programmed electron-computers. The measuring-value-indicator and setting members required for the purpose are not shown in detail.

The modus operandi of the described installation is the following: Cold comminuted raw material for cement is delivered to the suspension-gas-heat-exchanger 23 through the feed conduit 31 in the upper area and passes through the heat exchanger in countercurrent to the rising heating gases. The preheated comminuted raw material for cement preheated in the preheating step 2 consisting of three upper cyclones 23 coming out of the third cyclone step is introduced into the precalcination step 4, and there entered into the lower area of the exhaust gas conduit 27 and dispersed finely in the hot furnace-exhaust-stream. In this hot gas atmosphere the heat transfer takes place for the high heating of the preheated comminuted raw material and for the here-beginning calcination comparably without resistance and rapidly, so that the driving out of the $CO_2$ out of the individual limestone particle takes place rapidly and in spite of dropping temperature of the heat-imparting medium, the heat transfer to the material proceeds extraordinarily rapidly, and the calcination of the limestone particle may advance up to close to the particle core.

From the precalcination step of the suspension-gas-heat-exchanger, the precalcined material is conveyed through the conduit 35 to the after-calcination step 6, and there transferred into the reaction section 28, in which fuel heat by means of the burner 36 upon calcination of the fuel is supplied in hot cooler-exhaust-air. Thereby it is insured that the temperature difference required for an emphatic heat transfer in the case of continuous calcination up to the core of the comminuted particles of material, between heat-imparting medium and material to be calcined can be optimally adjusted. Also here, the dispersion-fine solution of the material stream favors a best-possible heat transfer and thereupon use of fuel. The material completely calcined in the after-calcination step 6, after separation from the hot combustion gases with the aid of the separator cyclone 29 is guided through the conduit 32 in the furnace inlet head 33 of the rotary kiln 25 and is there exclusively sintered. In the rotary kiln 25, with hot cooler-exhaust air 13, the remaining quantity of fuel 15 required for the calcination process is calcined. Hereby, also the installation of so-called short-rotary-kilns is made possible, so that in addition to the optimal economy of the calcination procedure, and an optimal economy of the calcination process itself, also the installation-investment may be lowered.

The exhaust gases 19 of the pre-calcination step 4 and the combustion gases 18 of the after-calcination step 6 are combined and used in common for the heating of the pre-heating step respectively for the preheating of the raw material in the upper three cyclone steps of the suspension-gas-heat exchanger.

For the case that the cement clinker is to be calcined from greatly alkali-containing raw material, the method according to the invention also provides to remove a part 21 of the furnace exhaust gases through a device 30 for partial gas withdrawal from the calcination process, in order thus to prevent the occurrence of circulations of harmful materials between sintering step and preheating step.

With respect to the constructive embodiment of the cement installation, countless variations are possible within the scope of the invention. Thus for example, the suspension-gas-heat exchangers shown have another cyclone-stepping than shown. It is also possible that the exhaust gases of the after-calcination step are guided through a gas-conducting construction known to every expert in the exhaust-gas-conduit 27 above the device 30 for the partial gas withdrawal, and all of the exhaust gases of the pre-calcination step then are guided directly into the pre-heating step of the suspension-gas-preheater.

The method according to FIG. 1 in accordance with the invention is indeed preferably in the treatment of raw material used in form of comminuted raw material and in a cement installation according to FIG. 2,—beyond this naturally also then when the raw material for example is to be treated granulated and the treatment devices corresponding hereto may be applied.

I claim as my invention:

1. An apparatus for the production of cement from raw material to the clinker stage which comprises:
   a preheat heat exchanger means having means for receiving and heating raw material;
   calcination heat exchanger means which comprise:
   a precalcination stage means connected to receive material from said preheat heat exchanger, and
   an after-calcination stage means with means for receiving material from said precalcination stage;
   a gas inlet means for each of said calcination stages providing heated air therefor;
   a fuel supply, burner, and air supply for supporting combustion of the burner for said after-calcination stage means of the calcination heat exchanger means; and
   a fuel fired sintering kiln means connected to receive material from said after-calcination stage.

2. An apparatus for the production of cement from raw materials to the clinker stage as described in claim 1 and which further comprises:
   a clinker cooler means connected to receive material from the kiln; and
   an exhaust air conduit leading from the cooler means to said after-calcination stage means for supplying the burner for said after-calcination stage.

3. An apparatus for the production of cement from raw material to the clinker stage as described in claim 1 and which further comprises:
   means for collecting exhaust gases from said precalcination and after-calcination stages; and
   means for conveying said gases to the preheat heat exchanger
   whereby the raw material therein is heated.

4. An apparatus for the production of cement from raw material to the clinker stages as described in claim 1 and which further comprises:
   a conduit form conveying exhaust gases from the sintering kiln to said precalcination stage; and
   a gas withdrawal conduit upstream from said precalcination stage
   whereby only a portion of the exhaust gases from the kiln, passes to the precalcination stage.

5. An apparatus for the production of cement from raw material to the clinker stages as described in claim 1 wherein said preheat heat exchanger and said calcination heat exchanger are cyclone heat exchangers.

6. An apparatus for the production of cement from raw material to the clinker stages as described in claim 1 wherein said sintering klin is a cylindrically shaped, elongate rotary kiln.

7. An apparatus for the production of cement from raw material to the clinker stages as described in claim 1 and further comprising:
   a clinker cooler connected to receive clinker from said sintering kiln, having a plurality of grates supporting the clinker with air able to pass through the clinker on the grates.

8. An apparatus for the production of cement from raw material to the clinker stages as described in claim 1 and further comprising:
   a clinker cooler connected to receive material from the kiln and having a plurality of tubes for conducting air for heat exchange with the clinkers.

* * * * *